United States Patent [19]

Thomas

[11] Patent Number: 5,406,816
[45] Date of Patent: * Apr. 18, 1995

[54] BICYCLE COOLER AND MOUNTING APPARATUS

[75] Inventor: Jan B. Thomas, Hilton Head Island, S.C.

[73] Assignee: Cycle Buddy Corp., Roswell, Ga.

[ * ] Notice: The portion of the term of this patent subsequent to Feb. 1, 2011 has been disclaimed.

[21] Appl. No.: 101,616

[22] Filed: Aug. 3, 1993

Related U.S. Application Data

[63] Continuation-in-part of Ser. No. 99,856, Jul. 30, 1993, which is a continuation-in-part of Ser. No. 923,059, Jul. 31, 1992.

[51] Int. Cl.⁶ .............................................. B62J 7/06
[52] U.S. Cl. .................................... 62/457.1; 62/239; 224/36; 224/30 A
[58] Field of Search ................. 62/457.1, 457.2, 457.7, 62/239; 224/30 A, 30 R, 31, 32 R, 35, 36, 38, 39, 40, 41; 248/223.4, 224.1, 224.2, 311.2

[56] References Cited

U.S. PATENT DOCUMENTS

| | | | |
|---|---|---|---|
| 652,325 | 6/1900 | McKnight | 224/32 R |
| 2,253,649 | 8/1941 | Price | 248/222.4 |
| 2,463,110 | 3/1949 | Johnson | 248/224.2 |
| 4,036,463 | 7/1977 | Hopkins et al. | 248/210 |
| 4,366,922 | 1/1983 | Levine et al. | 248/224.2 X |
| 4,566,617 | 1/1986 | Jackson | 224/275 |
| 4,756,454 | 7/1988 | Villanueva et al. | 224/30 A |
| 4,798,318 | 1/1989 | Irwin | 224/36 X |
| 5,024,359 | 6/1991 | Thomas | 224/30 A X |
| 5,129,613 | 7/1992 | Lloyd et al. | 248/221.3 |
| 5,282,554 | 2/1994 | Thomas | 224/36 |

FOREIGN PATENT DOCUMENTS 4008209 9/1991 Germany ............................ 224/36

Primary Examiner—Henry A. Bennet
Assistant Examiner—William C. Doerrler
Attorney, Agent, or Firm—McAndrews, Held & Malloy, Ltd.

[57] ABSTRACT

An insulated bicycle cooler adapted for detachable mounting to a mounting bracket. The mounting bracket is adapted for attachment to the head and handlebar intersection of a conventional bicycle.

23 Claims, 6 Drawing Sheets

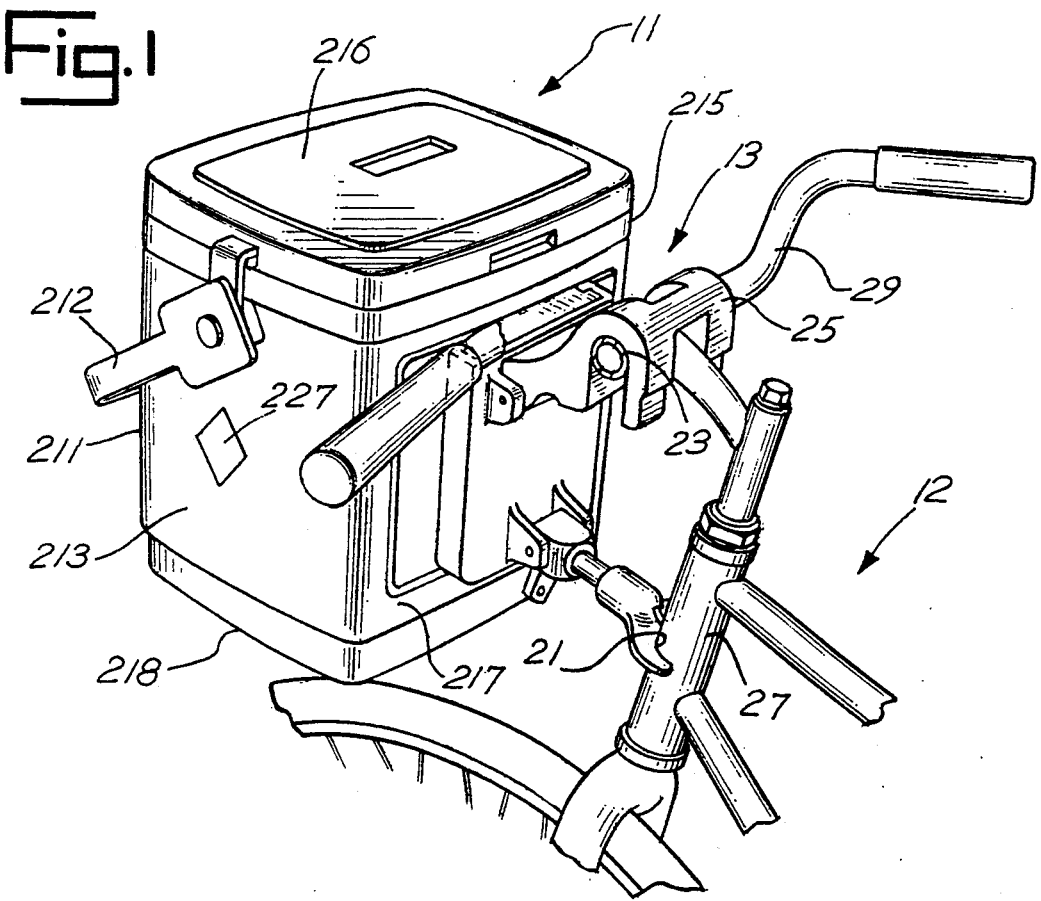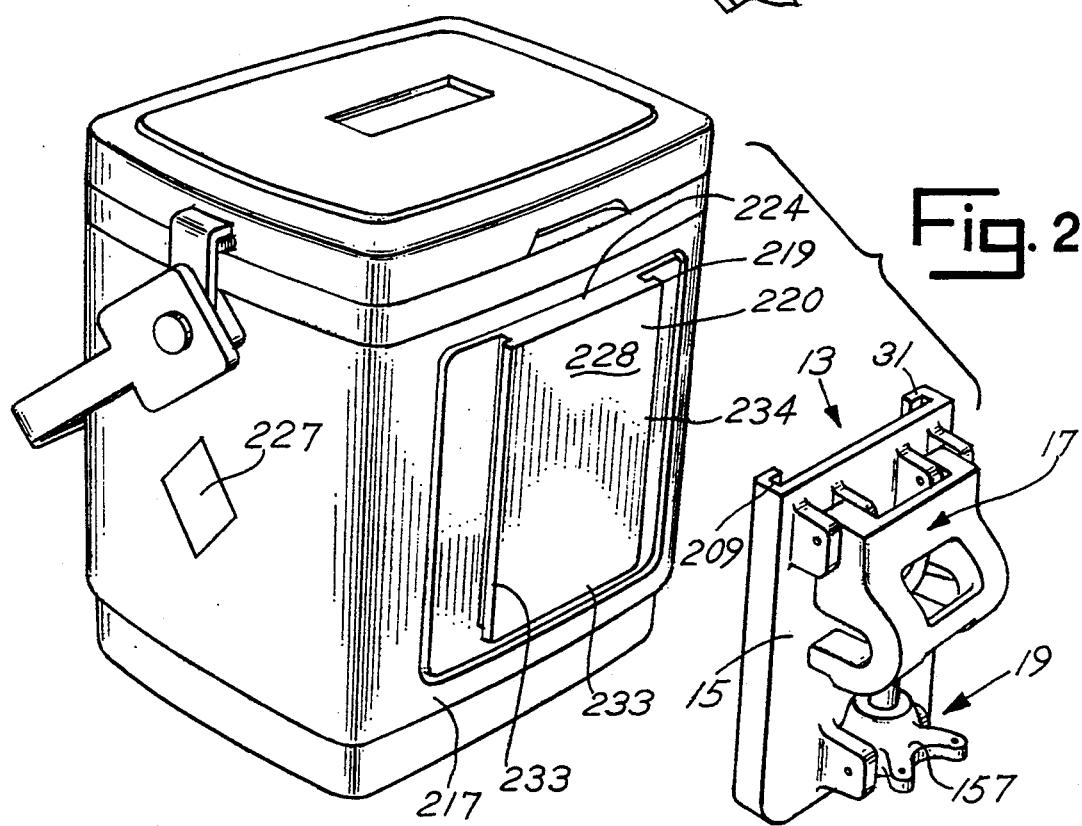

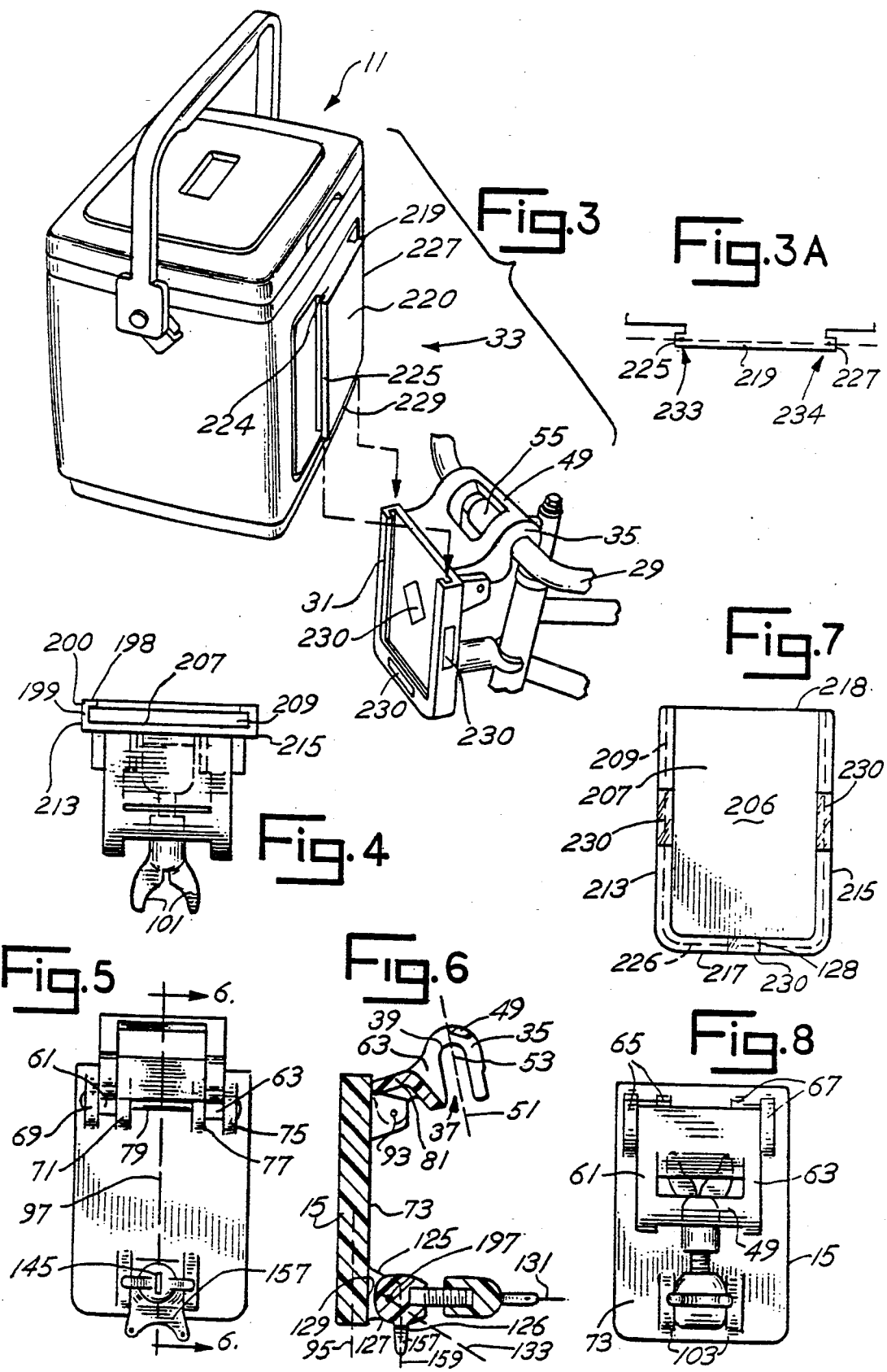

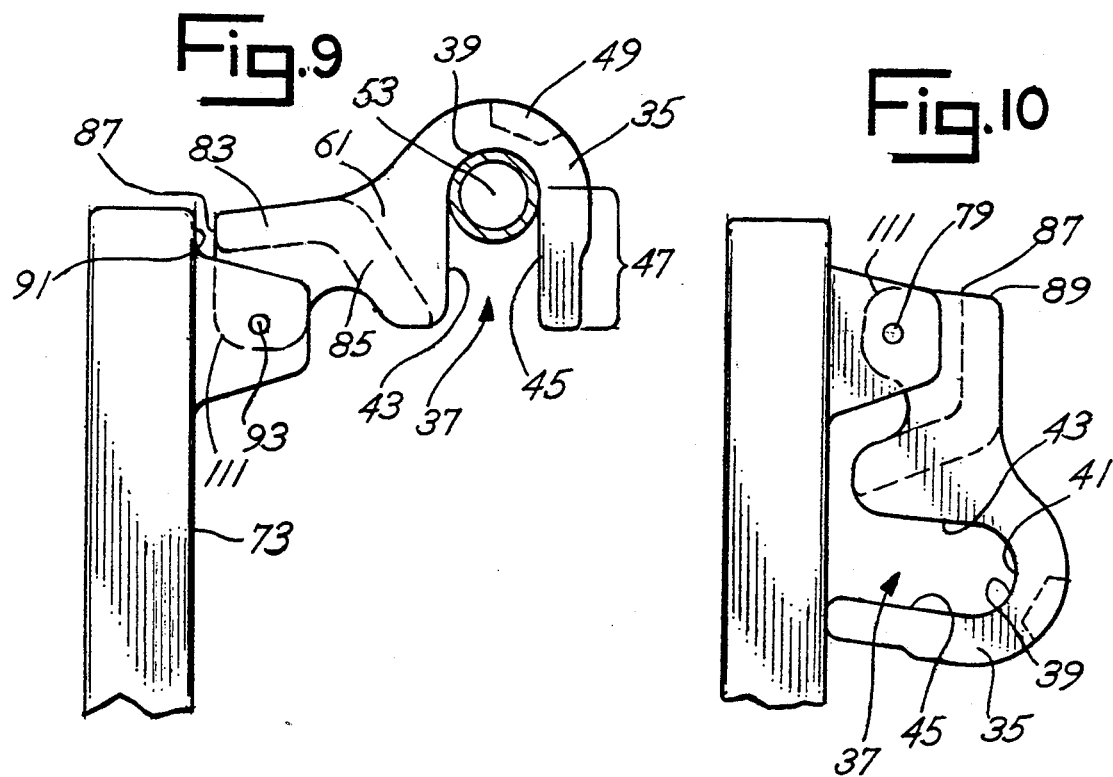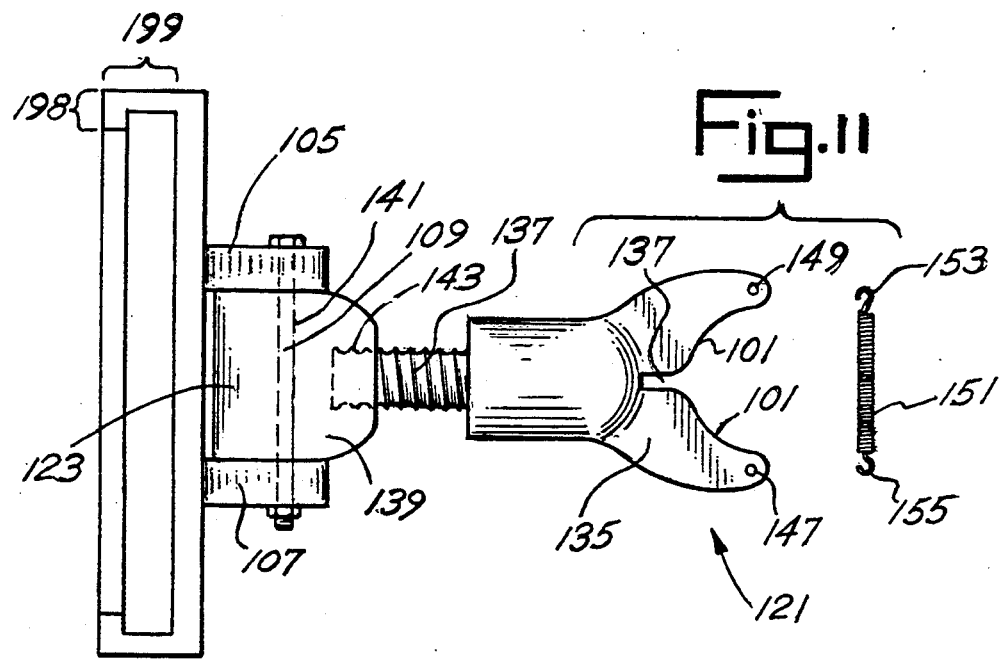

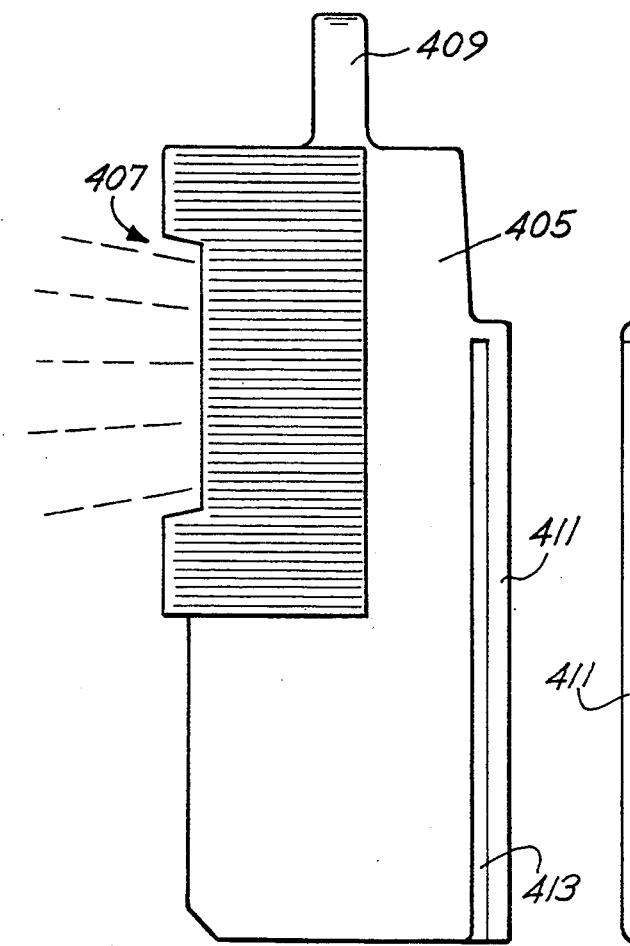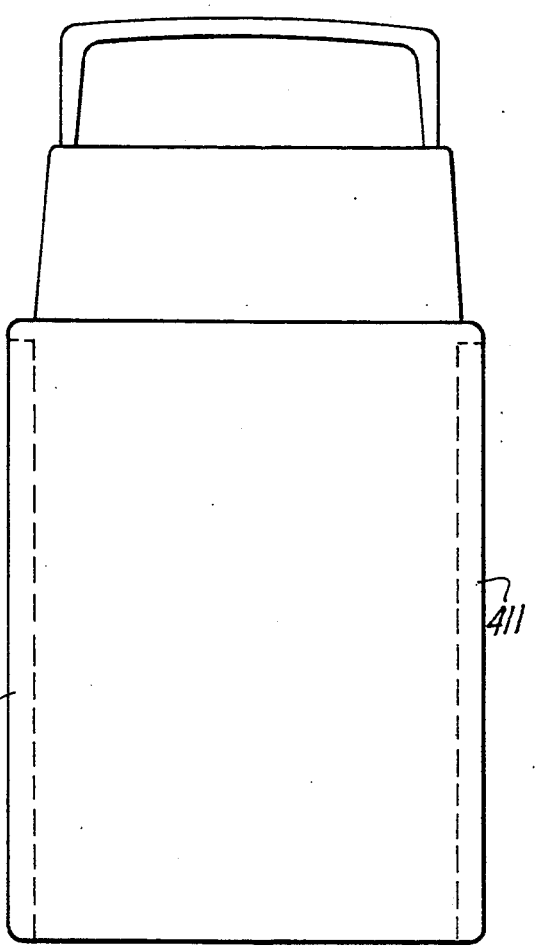

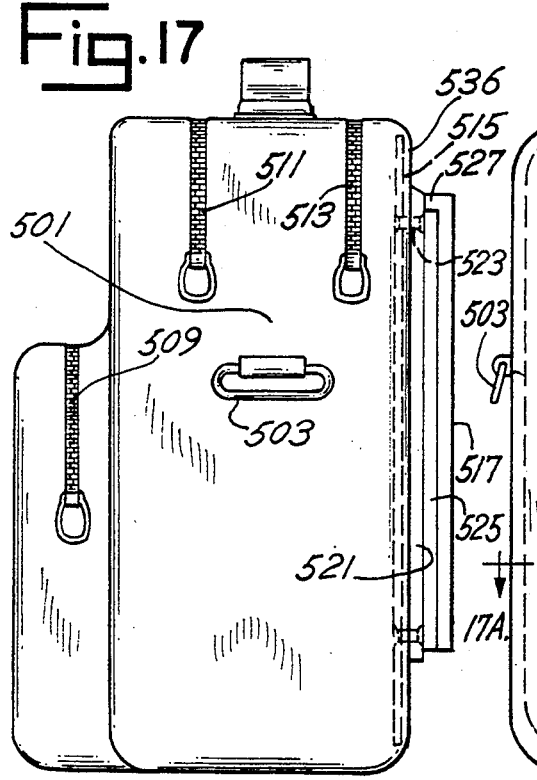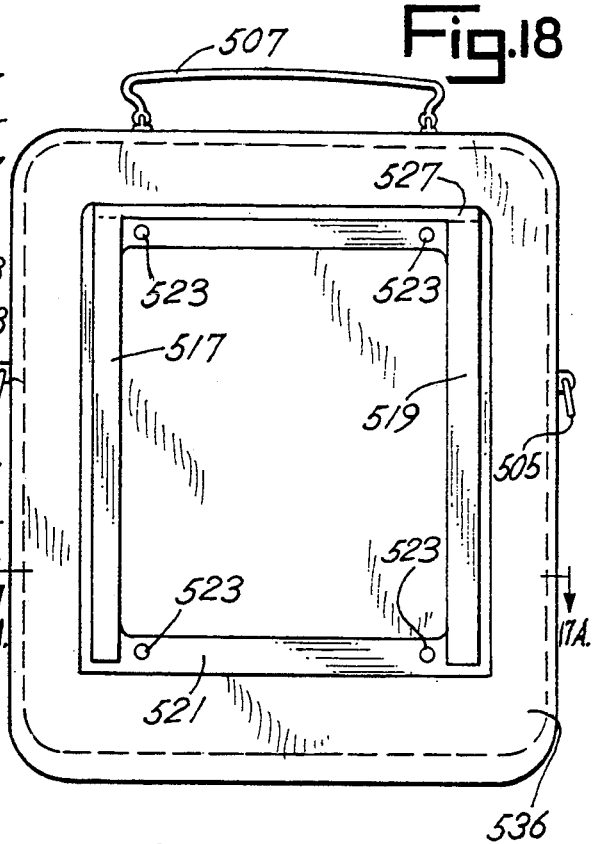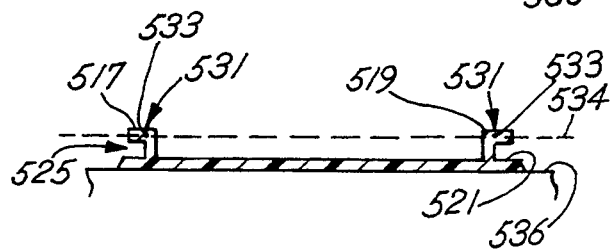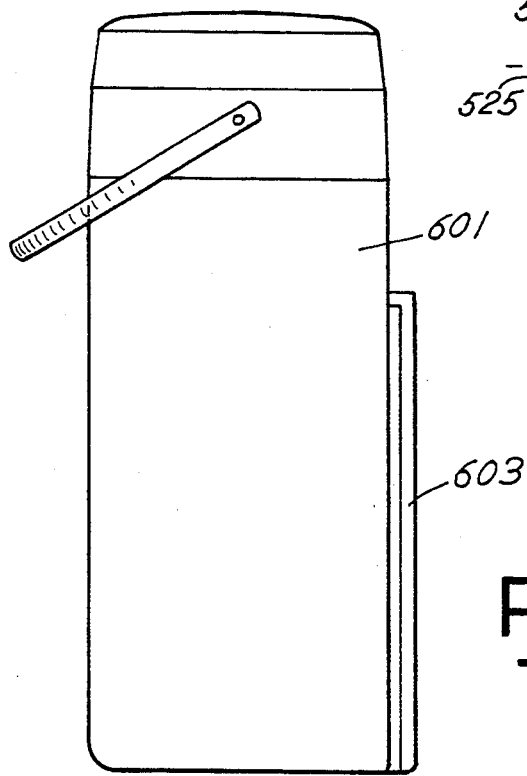

BICYCLE COOLER AND MOUNTING APPARATUS

RELATED APPLICATIONS

This application is a continuation-in-part of pending application Ser. No. 08-099,856, filed Jul. 30, 1993, which is a continuation-in-part of pending application, Ser. No. 07/923,059 filed Jul. 31, 1992, which is incorporated herein by reference.

BACKGROUND OF THE INVENTION

The invention relates to a mounting bracket for detachable mounting to the head and handlebar intersection of a conventional bicycle in combination with a container adapted for mounting to the bracket, and more particularly, relates to an insulated cooler having a connective attachment element adapted for mounting to the mounting bracket.

There are numerous bicycle packs, pack supports, baskets and other assemblies known in the prior art. These devices generally utilize straps and clips for attaching baskets or light weight packs to a bicycle. The object of these prior packs and pack supports is to provide a light weight, usually softsided or wire frame, container for transporting small articles normally used for bicycle maintenance or to carry amenities such as water, extra clothing, small amounts of food or other amenities.

However, occasions arise such as picnic trips, etc., where it is desired to carry much larger items by bicycle. It would be highly desirable to provide for a larger heavy duty container, such as an insulated cooler or similarly large container, having a simple design and which could be quickly and conveniently attached to a bicycle. It would also be desirable to utilize the same bracket structure which supports large heavy duty coolers with other structures such as bike lights, baskets, water bottles, etc.

It is therefore an object of the present invention to provide a heavy duty container and mounting bracket combination which easily attaches to and is removed from a bicycle.

It is a further object of the present invention to provide an insulated cooler adapted for mounting to a mounting bracket for attachment to a bicycle.

It is another object of the invention to provide a cooler mounting bracket combination wherein the cooler is provided with reflective material attached to one or more parts of the cooler and to one or more parts of the mounting bracket.

SUMMARY OF THE INVENTION

These and other objects are achieved in a container and mounting bracket combination for detachable mounting to the head and handlebar intersection of a bicycle frame. The mounting bracket is securable to the bicycle handlebars for removably receiving a container in a secure and stable position.

The back surface of the container includes a mounting platform adapted for connection to the mounting bracket.

BRIEF DESCRIPTION OF THE DRAWINGS

FIG. 1 is a perspective view of a bicycle cooler and mounting bracket mounted onto the handlebars of a bicycle.

FIG. 2 is a perspective view of the back side of the cooler disengaged from the mounting bracket, and a back view of the mounting bracket.

FIG. 3 is a perspective view of the back side of the cooler and the front side of the mounting bracket.

FIG. 3A is a top view of the mounting member portion of the cooler of FIG. 3.

FIG. 4 is a top end view of the mounting bracket.

FIG. 5 is a view of the back side of the mounting bracket.

FIG. 6 is a side view of the mounting bracket.

FIG. 7 is a view of the front side of the mounting bracket.

FIG. 8 illustrates the front side of the mounting bracket showing arm supports folded downwardly into their storage position, and the foot support folded upwardly.

FIG. 9 is a side view of the support arms.

FIG. 10 illustrates a side view of the support arms folded downwardly in a storage position.

FIG. 11 is a top view of the foot support member in an extended position.

FIG. 15 is a side view of a bike light for use with the mounting bracket of FIG. 1.

FIG. 16 is a back view of the bike light of FIG. 15.

FIG. 17 is a side view of a bicycle bike bag for use with the mounting bracket of FIG. 1.

FIG. 17A is a partial cross sectional view of the connector of the bike bag of FIG. 17 taken along lines 17A of FIG. 18.

FIG. 18 is a back view of the bike bag of FIG. 17.

FIG. 19 is a side view of a water bottle for mounting on bracket 13 of FIG. 1.

DETAILED DESCRIPTION OF THE INVENTION

Figure 12:
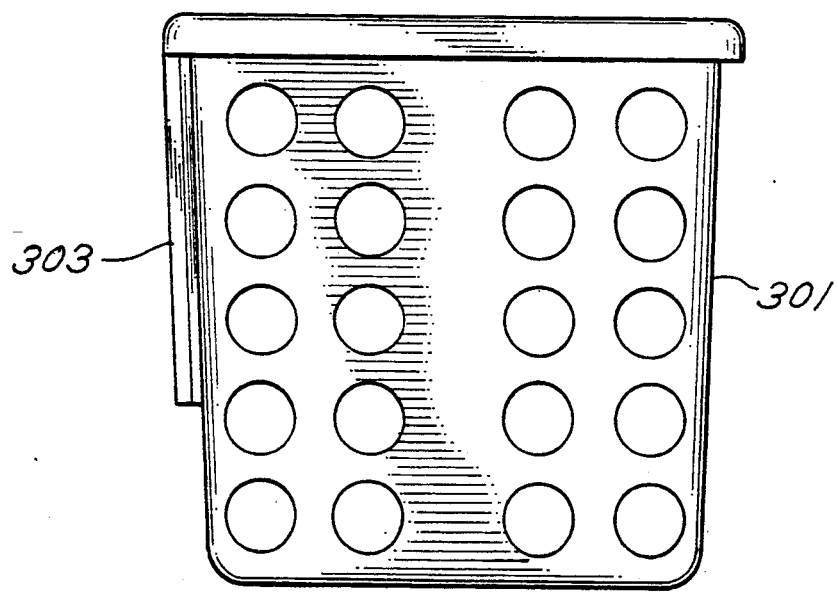
FIG. 12 is a side view of a basket for use with the mounting bracket of FIG. 1.

Referring to FIG. 1, a cooler 11 and a mounting bracket 13 are mounted onto a bicycle 12. As illustrated in FIG. 2, the mounting bracket 13 comprises a planar support platform 15, a handle bar support member 17 and an adjustable foot support member 19. Handle bar support member 17 and foot support member 19 serve to mount bracket 13 onto the bicycle engaging the bicycle at three separate areas 21, 23, 25. Engagement area 21 is located on the front portion of the bicycle head 27 and areas 23, 25 are spaced apart in locations on handle bars 29, which are cylindrical in shape. In addition, bracket 13 includes a groove defining structure 31, as best seen in FIG. 3, for mating engagement with a connector member 33 located on the rear of cooler 11.

As shown in FIG. 2, handle bar support member 17 and foot support member 19 are pivotable relative to platform 15 for folding the bracket into an unexpanded form, as shown in FIG. 2. Bracket 13 appears in its expanded form in FIG. 1.

Referring to FIGS. 6, 9, and 10, handle bar support member 17 comprises a pair of jaws 35 which slide down onto the handle bars 29, receiving the handle bars within a mouth opening 37. Jaws 35 cooperate with the handle bars 29 of the bicycle to firmly support mounting bracket 13 and the cooler 11 in a fixed relationship to the bicycle.

Each mouth opening 37 terminates in a cylindrical surface portion 39 for mating contact with the handlebars. The weight of the cooler 11 and bracket 13 maintains the handlebars at the terminal end 41 (FIG. 10) of opening 37 and against cylindrical surface portion 39. Mouth opening 37 is elongated away from the cylindrical surface portion 39. A pair of parallel elongated surfaces 43, 45 (FIG. 9) are spaced apart 15/16 of an inch, a distant slightly larger than the typical ⅞ inch diameter of conventional handlebars. The diameter of cylindrical surface portion 39 is slightly larger than ⅞ of an inch for receiving the handle bars. This permits the movement of handle bars 29 along the mouth opening and against the cylindrical surface portion 39. Surfaces 43, 45 are ¾ of an inch wide and extend outwardly from cylindrical surface portion 39, a distance 47 (FIG. 9) of approximately 1 and ⅜ inches, i.e., a distance greater than twice the radius of cylindrical surface 39. Elongated surfaces 43, 45 maintain the handlebars within opening 37 during bumpy movement of the bicycle over rough terrain or the like.

Handle bar support member 17 includes an extension support 49 (FIG. 3) connecting the two jaws 35 to prevent lateral movement thereof. As shown in FIG. 6, extension support 49 is located above and spaced from the cylindrical surface portion 39. In addition, extension support 49 is positioned to the front side of a central plane 51 defined by a line through the axis 53 of cylindrical surfaces 39 and a line equidistant from parallel elongated surfaces 43, 45. This position of extension support 49 avoids contact with a tightening screw (not shown) located in some conventional handlebar couplings 55 (FIG. 3) of the bicycle. Extension support 49 may be molded integrally with the jaws 35, as shown in FIG. 3.

Handle bar support member 17 includes a pair of arms 61, 63 (FIG. 8) which are integrally secured to a respective jaw 35. Arms 61, 63 are each pivotally attached to respective molded brackets 65, 67 (FIG. 8) which are molded integrally to the backside 73 of the planar support platform 15. Brackets 65, 67 are symmetrically positioned on the backside 73 of the platform such that arms 61, 63 are spaced apart a distance sufficient to permit jaws 35 to receive a conventional pair of bicycle handle bars within mouth openings 37. Each bracket 65, 67, includes a pair of upstanding bearing members 69, 71 and 75, 77 (FIG. 5) which are spaced apart a distance sufficient to permit arms 61 and 63 to pivot between bearing members 69, 71 and 75, 77, respectively. A metal pin or hard plastic pin 79 (FIG. 5) passes through both brackets 65, 67 and arms 61, 63. As understood, other pin arrangements may be used to pivotably mount arms 61, 63 to bearing members 69, 71, 73, 75.

Handle bar support member 17 includes a second extension support 81 (FIG. 6) which connects the two arms 61, 63 at their proximal ends to provide further support. As shown in FIG. 6, support 81 has an obtuse angular cross-section, somewhat "L" shaped, having a top leg 83 (FIG. 9) and a bottom leg 85 (FIG. 9). Support 81 may be constructed so as to only have a top leg 83, if desired.

As shown in FIGS. 9 and 10, the proximal end of each arm 61, 63 includes a flat rear surface 87. The upper portion 89 (FIG. 10) of rear surface 87 serves as a stop surface 89 for making contact with a flat surface 91 (FIG. 9) on the backside 73 of support platform 15. Contact abutment of stop surface 89 and flat surface 91 is shown in FIG. 6. The mating of stop surface 89 and flat surface 91 stops and limits the extent of upward pivotal rotation of handle bar support member 17 about pivotal axis 93 (FIG. 9) and establishes the position of mouth openings 37 of jaws 35 relative to the central plane 95 (FIG. 6) of the planar support platform 15. Thus, stop surface 89 and flat surface 91 establish the fully extended position of jaws 35 relative to planar support platform 15. In operation, when bracket 13 and cooler 11 are mounted onto handle bars 12, stop surface 89 engages against flat surface 91. The central plane 95 of the planar support platform 15 and the central plane 51 through jaw openings 37 intersect at line above the planar support platform 15. Planes 95, 51 are nonparallel, although the angle relationship between the two planes 95, 51 is relatively small. The handlebars 29 when fully seated in jaw openings 37 are disposed above the pivotal axis 93.

Adjustable foot support 19 is positioned below handlebar support member 17 on the planar support platform 15. Adjustable foot support 19 is located along the vertical center line 97 (FIG. 5) of the platform 15. Foot support 19 includes a curved surface 101 (FIGS. 4 and 11) which slidingly mates with the curved head 27 of the bicycle (as shown in FIG. 1) for providing a brace support to stabilize the mounting bracket and cooler assembly during bicycle movement. This three point engagement at areas 21, 23, 25 provides a fixed holding at two areas 23, 25 on the handlebars and a rotating support engagement at area 21 on the head, allowing the handlebars to be turned during bicycle operation.

Foot support 19 is pivotally attached to a molded bracket 103 (FIG. 8) which is formed integral with backside 73 of the platform 15. Bracket 103 includes a pair of upstanding bearing members 105, 107 (FIG. 11) which are spaced a distance apart sufficient to permit foot support 19 to pivot between members 105, 107. A metal or plastic pin 109 passes through both members 105, 107.

Referring again to FIG. 9, each arm 61, 63 is provided with a rounded surface 111 (FIGS. 9 and 10) which provides a smooth curved surface allowing arms 61, 63 to be rotated downwardly and against backside 73 (as shown in FIGS. 2 and 8). FIGS. 2 and 8 show the bracket in its closed or unexpanded position.

Referring again to FIG. 11, adjustable foot support 19 includes a distal end 121 which carries curved surface 101 and a proximal end 123 which is pivoted between upstanding members 107, 109. Proximal end 123 is shaped with an upper curved surface 125 (FIG. 6) for permitting foot support 19 to pivot vertically upwardly against the backside 73 of the planar support platform 15 as shown in FIGS. 2 and 8. A lower flat surface 127 (FIG. 6) is also carried by proximal end 123 for making contact with a corresponding flat surface 129 carried on backside 73 between upstanding members 103, 107 in order to stop and limit downward rotation of foot support 19 such that its longitudinal plane 131 (FIG. 6) lies along plane 133. Plane 133 forms an acute angle of approximately 45° with central plane 95. When bracket 13 and cooler 11 are mounted onto the bicycle, foot support member 19 will be fully expanded to plane 133 via control of stop surface 127.

Referring again to FIG. 11, distal end 121 of foot support 19 includes a head brace 135 designed for engaging bicycle head 27 (FIG. 1). Curved surface 101 is of a size for making contact with a conventional cylindrical bicycle head 27. A slot 137 is formed in the center area of curved surface 101 for receiving the brake cable of the bicycle if the bicycle has a brake cable extending down the front of the head 27.

A base member 139 forms the proximal end of foot support 19 and includes a pivot hole 141 for receiving pivot pin 109 which passes through base member 139 and upstanding bearing members 105, 107. The base member 139 includes a threaded interior cylindrical opening 143.

Head brace 135 is rigidly attached to a threaded cylindrical extension member 137. Foot support 19 is adjustable in length via the threaded extension member 137. Threaded extension member 137 and head brace 135 are manually rotated relative to base member 139 to extend the adjustable foot for forcing head brace 135 against the bicycle head and spacing the cooler relative to the bicycle head. As shown in FIG. 5, a slot 145 is formed in the end of head brace 135. Slot 145 serves as a screw driver receiving slot to permit screw driver manipulation of head brace 135 and extension member 137.

In addition, head brace 135 may include a pair of holes 147, 149 (FIG. 11) formed on opposite sides of curved surface 101. A security strap 151 includes a pair of fastening hooks 153, 155 for fastening into holes 147, 149. Strap 151 may be formed from an elastic material or spring material, and fits around the back of the head of the bicycle for biasing head brace 135 against the front of the head.

The proximal end of foot support 19 also includes a second head brace 157 of the same general configuration as head brace 135 (FIGS. 2, 5 and 6). The head brace 157 extends from base member 139 along a longitudinal plane 159 which is at a 90° angle from the plane 131 of head brace 135. The location of the head brace 157 on the proximal end of the foot support 19 is such that when head brace 135 engages the bicycle head, head brace 157 extends downwardly as shown in FIG. 1. When the adjustable foot support is pivoted upwardly against the back side of the mounting bracket, the head brace 157 is positioned so as to engage the bicycle head as shown in FIG. 2. The second head brace is also equipped with a groove 126 (FIG. 6) to allow passage of a bicycle cable and with holes to allow the use of a retention strap.

The distance between the bicycle head 27 and the mounting bracket 13 is shorter when using head brace 157 than that possibly obtainable when using head brace 135. Thus, a shorter spacing head brace is provided through brace 157.

Referring now to FIG. 7, the front side 207 of the planar support platform 15 is provided with a flat surface 206. Front side 207 supports a mounting structure comprised of an L-shaped wall 200 (FIG. 4) which defines a grooved retention slot 209 disposed along the two side edges 213, 215 and along the bottom edge 217 of the planar support platform 15. Grooved retention slot 209 provides for the detachable engagement of the mounting bracket 13 with the cooler 11. As shown in FIG. 4, slot 209 is formed of a C-shaped channel on each side 213, 215 of platform 15. The C-shaped channel is formed by L-shaped wall 200 which is molded integral to and projects outwardly from the flat surface 206 of front side 207 of the platform 15. The L-shaped wall 200 is continuous and wraps around the bottom edge 217 of platform 15. The top side 218 of platform 15 is open for permitting a connector or mounting member 220 (FIG. 2) to slide within the C-shaped channel.

Mounting bracket 13 may be constructed from a wide variety of suitably rigid plastics by molding processes widely known in the art. In addition, it is also contemplated that the mounting bracket may be made from other materials such as wood or metal.

Referring now to FIG. 1, the bicycle cooler 11 comprises an insulated cooler of the type that is widely known and commonly used to keep food, beverages or other items cold or warm. It weighs approximately five (5) pounds when empty. Other types of containers may also be used.

Cooler 11 includes a front wall member 211, two side wall members 213, 215, a back wall member 217 and a bottom wall member 218, forming a rectangular box-shaped cooler. A removable lid 216 rests atop the cooler in a conventional fashion. A handle 212, is pivotally secured to the side wall members of the cooler permitting the cooler to be manually carried about, upon its release from mounting bracket 13.

Cooler 11 is adapted for mounting onto the mounting bracket 13 via mounting member 220 (FIG. 2) which is secured to the back wall member 217 of the cooler. Mounting member 220 includes a planar mounting platform 219 for fitting securely within the retention slot 209. Platform 219 is raised away from the surface of back wall member 217 via a spacer section 224 formed integral with platform 219. Platform 219 has its two side edges 225, 227 (FIG. 3A) and its bottom edge 229 (FIG. 3) overhanging or protruding from spacer section 224 so as to form two rails or side tabs 233, 234 (FIG. 2) of a shape so as to fit securely within the retention slot 209 of the mounting bracket 13.

The mounting member 220 can be integrally molded as part of the back side of the cooler or can be fabricated separately and affixed to the cooler by way of adhesives, screws or other structures, thus adapting the cooler for mounting onto the mounting bracket 13.

The cooler is mounted onto the mounting bracket 13 by sliding the side rails 233, 234 of mounting platform 219 into the retention slot 209 of the mounting bracket. The platform 219 is slid downwardly within slot 209 until the bottom edge 229 (FIG. 3) of platform 219 contacts the bottom inside surface 226 (FIG. 7) of L-shaped member 200. Bottom surface 226 abuts against the bottom edge 229 of platform 219 so as to prevent further downward movement of cooler 11 relative to a reference plane defined by the surface 226.

If desired, the mounting platform 219 may be constructed from any of a variety of surface materials such as Teflon rubber (a polytetrafluorethylene plastic material), textured plastic or other surfaces so as to achieve the appropriate frictional relationship between the cooler and the mounting bracket. As seen, platform 219 is a structural member configured to present engageable surfaces which are slidingly received by C-shaped channel slot 209. This configured structure 219 is both sturdy and sufficiently wide to provide surface area on the back side of the cooler to give stability to the supporting of the cooler by the mounting bracket.

L-shaped member 200 holds and constrains platform 219 from movement outwardly away from front side 207 of the bracket 13 (i.e., in the Z direction) as well as constrains sideward movement relative to front side 207 (i.e., in the X direction) as well as constrains downward movement relative to front side 207 (i.e., in the Y direction). Because of the relative width of platform 15 and the points of restraint by L-shaped wall 200, twisting about the Y-axis is inhibited.

As will suggest itself, mounting member 220 may be configured in a form other than a projecting platform. For example, a singe pair of parallel rails 233, 234 which are spaced apart, may be used to engage slot 209. A third rail (or a surface of the two rails) may be used to provide the bottom stop edge 229 for mating with surface 226 of the bracket.

Platform 219 has a flat front surface 228 (FIG. 2) for sliding engagement with the flat surface 206 (FIG. 7) of support platform 15. Alternatively, a narrow flat surface may be provided only along each side 225, 227 (FIG. 3) to form a pair of rails. That is, the central section of surface 228 may be removed, if desired.

Support platform 15 of the bracket is approximately 6 and ⅜ inches in width and approximately 6 and ¼ inches in height and approximately ¼ inches in depth. Groove slot 209 is approximately 3/16 inches in width.

In addition, slot 209 is defined by a mounting structure 15 and 200 which provides engageable surfaces for receiving the configured structural mounting member 220. As will suggest itself, mounting structure 15, 200 may be configured in a form other than a C-shaped channel slot. The mounting structure 15, 200 provides a member having a configuration which engages the configuration of mounting member 220. For example, the mounting structure 15, 200 and the mounting member 220 may be reversed such that cooler 11 carries a slot 209 and mounting bracket 13 carries a platform 219. In such a case, slot 209 and platform 219 would be inverted by 180° as understood. In addition, the mounting bracket may be equipped with reflectors 230.

Cooler 11 also may be equipped with reflectors 227 (FIG. 2) so as to make the cooler visible in conditions of low light or bright. The reflectors 227 may be in the form of reflective tape, reflective plastic or metal, round or polyhedral reflectors which are attached to the front and sides of the cooler, to the handle of the cooler or may be incorporated as a component of any design or labelling used on the cooler.

The cooler 11 may be fabricated from plastics by molding or other fabrication processes well known in the art. In addition, the pivot axis 197 of foot support member 19 is approximately 4 and ½ inches below the pivot axis 93 of handlebar support member 17. Arms 61, 63 have central longitudinal planes which are spaced by approximately 3 and ¼ inches.

Referring to FIG. 12, a bicycle basket 301 may be mounted to bracket 13 for support in front of the bicycle handlebars in the same manner as cooler 11 is supported in FIG. 1. Basket 301 may be molded from plastic and include a plurality of openings to provide a basket-like appearance to the container 301. Basket 301 includes a mounting member 303 for engagement in slot 209 (FIG. 4) of the bracket 13.

Figure 13:
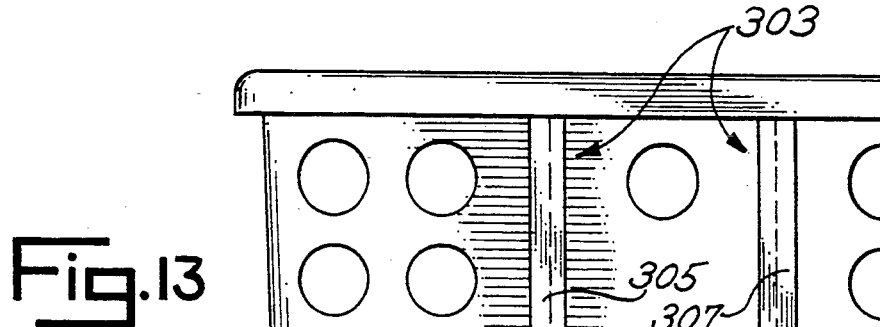
FIG. 13 is a rear view of the basket of FIG. 12.
Figure 14:
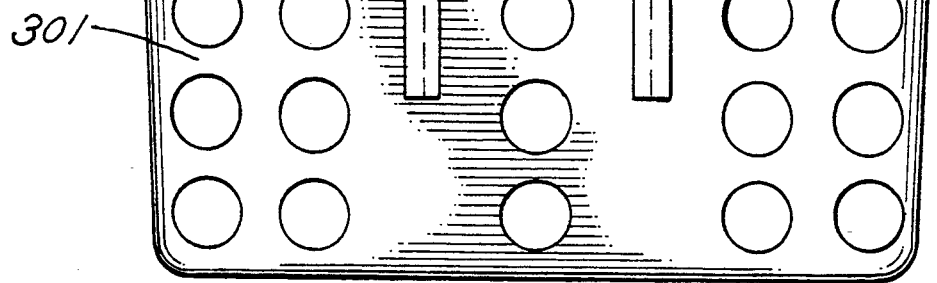
FIG. 14 is a partial top view of the basket of FIG. 12.

Referring to FIGS. 13, 14, mounting member 303 is formed from a pair of L-shaped rails 305, 307. The outer leg 309 of each rail 305, 307 are slidingly received into groove slot 209 of the bracket 13. The other leg 311 of each rail 305, 307 serve to support legs 309 at an extended position from the backside of basket 301. Legs 309 serve as rails presenting a flat outer surface 306.

Referring to FIG. 15, a bike light 405 may be mounted to bracket 13. Bike light 405 includes an aperture 407 in which light emanates. Conventional lamp, circuitry and batteries are housed with the light 405. A handle 409 is mounted on the top of light 405 so that the bike light may be removed from the bracket and carried about by its handle 409. As shown in FIGS. 15 and 16, a pair of rails 411 are formed by a pair of groove channels 413. Rails 411 are slidingly received in to retention slot 209 (FIG. 4) of bracket 13.

Referring to FIGS. 17 and 18, a bike bag 501 may be mounted onto bracket 13. Bike bag 501 includes a plurality of caring handles 503, 505 and 507, for carrying the bike bag about after it has been removed from bracket 13. The bike bag is used to carry or store various items and may include a plurality of zippers 509, 511, 513 for providing access to compartments of the bike bag 501.

Bike bag 501 includes a back stiffener 515 which forms the back of the bag and provides support to a pair of mounting rails 517, 519. Rails 517, 519 upstand from a base support member 521 which is secured to the back stiffener by rivets or screws 523. Rails 517, 519 have an L-shaped cross section, as shown in FIG. 17A, which defines a groove 525. Rails 517, 519 are sized for slidingly engaging the retention slot 209 (FIG. 4) in the back side of bracket 13.

A top surface member 527 extends over the groove 525 of each rail and provides a stop for limiting the upward extent of movement of leg 198 (FIG. 4) of the L-shaped wall 200. Leg 198 rides within groove 525. L-shaped wall 200 includes another leg 199. Rails 517, 519 include outer flat surfaces 531. Each rail 517, 519 include a longitudinal axis 533 running the length of the rail. The two lines of the longitudinal axis 533 define a plane 534 which is parallel to the outer surface 536 of the bag or other device to which base support member 521 is attached.

Bike bag 501 is mounted to the bracket and bicycle in a manner similar to cooler 11 as shown in FIG. 1. As will suggest itself, base support member 521 and rails 517, 519 may be screw secured to the back of a cooler similar to cooler 11.

Referring to FIG. 19, a water bottle 601 of the insulated type includes a pair of rails 603 (1 being shown) which are mounted in a fashion similar to rails 411 on bike light 405 (FIG. 16). Rails 603 are positioned and shaped for sliding engagement into retention slot 209 (FIG. 4) in the bracket 13. The rails 603 may be molded integrally with the outside surface of the bottle 601 or secured thereto by screws or the like.

Other modifications and additions to the present invention not disclosed herein may also be made without departing from the spirit and scope of the invention which is defined by the following claims.

What is claimed is:

1. A container and mounting bracket combination, the bracket adapted for detachable connection of a container to a bicycle, the bicycle having a frame, a head, and handlebars, comprising:

a container having a back side;

a connector fixed to the back side of said container, said connector having a pair of rails being vertically disposed along said back side of said container;

a mounting bracket disengageably mountable to said container, said mounting bracket having
  (i) a planar support platform, said planar support platform having a front side and a rear side;
  (ii) channel means fixed to said front side of said platform and providing a vertically extending slot for slidingly receiving said rails, said channel means constraining said rails to limit frontward and rearward movement thereof relative to said platform;
  (iii) a support stop means disposed in a position relative to said slot for engaging said rails to support said rails and to limit the extent of downward movement thereof relative to a reference plane; and (iv) attachment means connected to said rear side of said planar support platform, said attachment means having jaw members for mating with the handlebars of a bicycle for disengageably mounting said platform to the handle bars of the bicycle.

2. A combination according to claim 1 wherein each of said rails includes a sidewardly extending tab, each said tab being spaced outwardly away from the back side of said container.

3. A combination according to claim 2 wherein each said tab has a longitudinal axis, the longitudinal axes of said tabs defining a vertical plane disposed substantially parallel with said back side of said container.

4. A combination according to claim 2 wherein each said tabs extends in opposed directions.

5. A combination according to claim 2 wherein each said tab includes an outer flat surface.

6. A combination according to claim 5 wherein said connector includes a central section having a flat surface coplanar and continuous with said outer flat surface of each said tab.

7. A combination according to claim 1 wherein each said rail is L-shaped in configuration.

8. A combination according to claim 1 wherein said connector includes a flat base surface for mating engagement with said support stop means.

9. A combination according to claim 8 wherein said flat base surface is located at the vertically lower end of each of said rails.

10. A combination according to claim 1 wherein said pair of rails are spaced apart at least four inches.

11. A combination according to claim 10 wherein said pair of rails are disposed in a parallel relationship.

12. A container and mounting bracket combination, the bracket adapted for detachable connection of a container to a bicycle, the bicycle having a frame, a head, and handlebars, comprising:

a container having a back side;

a mounting bracket having a planar support platform, said planar support platform having a front side and a rear side;

a mateable connecting means comprised of a pair of mating members, one of said members being fixed to the back side of said cooler, and the other of said members being fixed to said front side of said platform, said pair of mating members comprising:

(i) a pair of rails; being vertically disposed relative to the back side of said container and relative to the front side of said platform; and (ii) means for slidingly receiving said rails and stopping the extent of sliding of said rails and supporting said rails relative to a fixed reference plane, said means including a vertically extending slot and a stop means at the base of said slot; and attachment means connected to said rear side of said planar support platform for attachment of said platform to the handlebars of a bicycle.

13. An insulated cooler and mounting bracket combination for detachable mounting of the cooler to the handlebars of a bicycle comprising:

an insulated cooler having a front wall, a bottom, two side walls, and a back wall;

a connector secured to said back wall of said cooler, said connector having a first configured structure;

a mounting bracket formed of a body member having a front side providing one area of mountability and a rear side providing another area of mountability; said mounting bracket comprising:

(i) a second configured structure carried by said front side of said body member and engageable with said first configured structure, the engagement of said first and second configured structures securely mounting said cooler in a fixed relationship with said bracket;

(ii) a support structure extending from said rear side of said body member and mountable onto the handlebars of a bicycle for stable securement of said mounting bracket to the bicycle during movement of the bicycle, said support structure spacing said body member outwardly in front of the handlebars, said support structure including support arm means pivotally mounted to said rear side of said body member and engageable with the handlebars of the bicycle;

whereby said insulated cooler is disengageably mounted to said mounting bracket and wherein said mounting bracket is disengageably mounted to the bicycle.

14. An insulated cooler and mounting bracket combination according to claim 13 wherein said support arm means includes a jaw opening for receiving the handlebars.

15. An insulated cooler and mounting bracket combination according to claim 13 wherein said support arm means includes a pair of support arms extending outwardly from said rear side of said bracket and each said arm being pivotally mounted to said rear side of said body, each said arm having a jaw opening for receiving the handlebars.

16. An insulated cooler and mounting bracket combination according to claim 14 wherein said jaw opening is a slotted opening defined by parallel elongated surfaces formed in said support arm means.

17. An insulated cooler and mounting bracket combination according to claim 15 for detachable mounting of the cooler onto the handlebars of a bicycle, the handlebars having a cylindrical shape, wherein said elongated surfaces are of a length greater than the diameter of the handlebars.

18. An insulated cooler and mounting bracket combination according to claim 14 wherein said jaw opening terminates in a cylindrical surface.

19. An insulated cooler and mounting bracket combination according to claim 16 wherein each of said elongated surfaces is oriented in a vertical plane when said mounting bracket is mounted onto the handlebars.

20. An insulated cooler and mounting bracket combination according to claim 13 wherein said arm means is pivotable about an axis; and further including stop means for limiting the upper pivotal position of said support arm means for causing the position of engagement of said arm means with the handlebars to be located at a position vertically spaced above said pivot axis when said cooler is mounted onto said bracket and said bracket is mounted onto the handlebars.

21. An insulated cooler and mounting bracket combination according to claim 14 wherein said body member has a first longitudinal plane and wherein said jaw opening defines a second longitudinal plane, said first and second longitudinal planes intersecting at a point above said bracket.

22. An insulated cooler and mounting bracket combination according to claim 13 and wherein said support structure includes a foot member pivotally mounted to said rear side of said body member and engageable with the head of a bicycle.

23. An insulated cooler according to claim 22 wherein said foot member is pivotal about an axis; and further including stop means for limiting the lower pivotal position of said foot member for causing the position of engagement of said foot member with the head of the bicycle to be located at a position vertically spaced below said pivot axis when said bracket is mounted onto the handlebars.

* * * * *